(12) United States Patent
Kannan et al.

(10) Patent No.: US 8,130,661 B2
(45) Date of Patent: Mar. 6, 2012

(54) SYSTEMS AND METHODS FOR INTELLIGENT PROBE TESTING

(75) Inventors: Navneeth N. Kannan, Westford, MA (US); Eric W. Gray, Lee, NH (US)

(73) Assignee: OPNET Technologies, Inc., Bethesda, MD (US)

( * ) Notice: Subject to any disclaimer, the term of this patent is extended or adjusted under 35 U.S.C. 154(b) by 1307 days.

(21) Appl. No.: 10/903,586

(22) Filed: Aug. 2, 2004

(65) Prior Publication Data
US 2005/0094567 A1    May 5, 2005

Related U.S. Application Data

(60) Provisional application No. 60/491,566, filed on Aug. 1, 2003, provisional application No. 60/577,165, filed on Jun. 7, 2004.

(51) Int. Cl.
*G01R 31/08* (2006.01)
*G06F 11/00* (2006.01)

(52) U.S. Cl. .......................... 370/252; 370/241; 370/244
(58) Field of Classification Search .................. None
See application file for complete search history.

(56) References Cited

U.S. PATENT DOCUMENTS

| | | | | |
|---|---|---|---|---|
| 4,545,011 A * | 10/1985 | Lyon et al. | ...................... | 714/43 |
| 5,610,905 A * | 3/1997 | Murthy et al. | ................. | 370/401 |
| 5,748,612 A * | 5/1998 | Stoevhase et al. | ............ | 370/230 |
| 5,878,032 A * | 3/1999 | Mirek et al. | ................... | 370/235 |
| 6,104,700 A * | 8/2000 | Haddock et al. | .............. | 370/235 |
| 6,717,914 B1 * | 4/2004 | Hamami | ....................... | 370/248 |
| 6,775,826 B1 * | 8/2004 | Zahavi et al. | ................. | 717/128 |
| 6,950,405 B2 * | 9/2005 | Van Gerrevink | .............. | 370/252 |
| 6,963,575 B1 * | 11/2005 | Sistanizadeh et al. | ........ | 370/404 |
| 7,516,211 B1 * | 4/2009 | Gourlay et al. | ............... | 709/224 |
| 2002/0167936 A1 | 11/2002 | Goodman | | |
| 2004/0034492 A1 * | 2/2004 | Conway | ......................... | 702/81 |
| 2004/0088405 A1 * | 5/2004 | Aggarwal | ..................... | 709/224 |
| 2004/0153854 A1 * | 8/2004 | Agrawal et al. | ................. | 714/43 |
| 2004/0223500 A1 * | 11/2004 | Sanderson et al. | ....... | 370/395.53 |
| 2007/0041329 A1 * | 2/2007 | Schine | .......................... | 370/250 |

FOREIGN PATENT DOCUMENTS

| EP | 0 957 432 A2 | 11/1999 |
|---|---|---|
| EP | 0957432 A2 | 11/1999 |
| EP | 1447940 A2 | 8/2004 |
| WO | WO 02/51181 A1 | 6/2002 |
| WO | WO 02/51181 A1 | 6/2002 |

OTHER PUBLICATIONS

E. Rosen et al., The Internet Society, "BGP/MPLS VPNs," (RFS-2547) 1999.
D. Farinacci et al., The Internet Society, "Generic Routing Encapsulation," (RFS-2784) 2000.
S. Shenker et al., The Internet Society, "Specification of Guaranteed Quality of Service," (RFC-2212) 1997.

* cited by examiner

*Primary Examiner* — Ayaz Sheikh
*Assistant Examiner* — Sori Aga
(74) *Attorney, Agent, or Firm* — Robert M. McDermott, Esq.

(57) ABSTRACT

Systems and methods are disclosed for testing a processor having at least a first interface. In one embodiment, the method includes configuring, at the processor, a second interface, such that the configured second interface has one or more quality of service parameters representative of the first interface; sending one or more packets through the configured second interface, the one or more packets being representative of another packet received at the first interface; and determining, based on the one or more packets, one or more performance parameters corresponding to the first interface under test.

31 Claims, 10 Drawing Sheets

SYSTEMS AND METHODS FOR INTELLIGENT PROBE TESTING

CROSS REFERENCE TO RELATED APPLICATION

This application claims the benefit of priority to U.S. provisional application No. 60/491,566, filed Aug. 1, 2003, entitled "SYSTEMS AND METHODS FOR INFERRING SERVICES ON A NETWORK," and to U.S. provisional application No. 60/577,165, filed Jun. 7, 2004, entitled "SYSTEMS AND METHODS FOR INTELLIGENT PROBE TESTING,", both of which are expressly incorporated by reference herein in their entirety.

BACKGROUND OF THE INVENTION

I. Field of the Invention

The present invention generally relates to communication systems and, in particular, to systems and methods for testing network systems and processors.

II. Background and Material Information

Probes can be used to test a communication network, including any part of the network, such as network nodes, devices, components, interfaces, links, protocols, and the like. For example, in a simple network consisting of two routers connected by a communication link (such as an Internet Protocol (IP) network), a probe may be configured at each router to measure various parameters including packet loss, jitter, latency, etc. Each of the probes may be a hardware-type probe, a software-type probe, or a combination of the two.

When a network service provider offers network services to a customer, they usually agree on one or more performance or service levels to be provided by the network. For example, a customer may have two types of traffic, such as voice traffic and email traffic, each of which may require a different level of service. In this example, the customer may enter into a Service Level Agreement (SLA) that provides a higher level of service (e.g., low jitter, low latency, and low packet loss) to voice traffic, and a lower level of service (e.g., best efforts) to email traffic. The network service provider and the customer will then want to know whether the performance parameters of the SLA are being met. If the service provider has other SLAs for other customers, the performance associated with those other customers will also be of interest.

To that end, probes have typically been deployed to monitor each customer and/or service. Although it may be useful to accurately monitor performance for every customer, in a complex network environment with a variety of customers and/or services, deploying a probe at/to each customer or service interface is not practical (e.g., it is cost prohibitive). Therefore, there is a need to provide a system and method that can monitor the performance of customers and/or services without requiring the deployment of a dedicated hardware and/or software probe to each customer location and/or interface.

SUMMARY OF THE INVENTION

The present invention is directed to systems and methods for testing network systems and processors.

Systems and methods consistent with one embodiment of the present invention can test a first processor having at least a first interface by configuring, at the first processor, a second interface, such that the configured second interface has one or more quality of service parameters representative of the first interface. Moreover, systems and methods consistent with one embodiment of the present invention can send one or more packets through the configured second interface, the one or more packets being representative of one or more other packets received at the first interface. Furthermore, systems and methods consistent with one embodiment of the present invention can determine, based on the one or more packets, one or more performance parameters corresponding to the first interface under test.

Additional features and advantages of various embodiments may be realized and attained by the systems and methods particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to embodiments of the invention, examples of which are illustrated in the accompanying drawings and described in the specification. Wherever possible, the same reference numbers will be used throughout the drawings to refer to the same or like parts.

Figure 1:
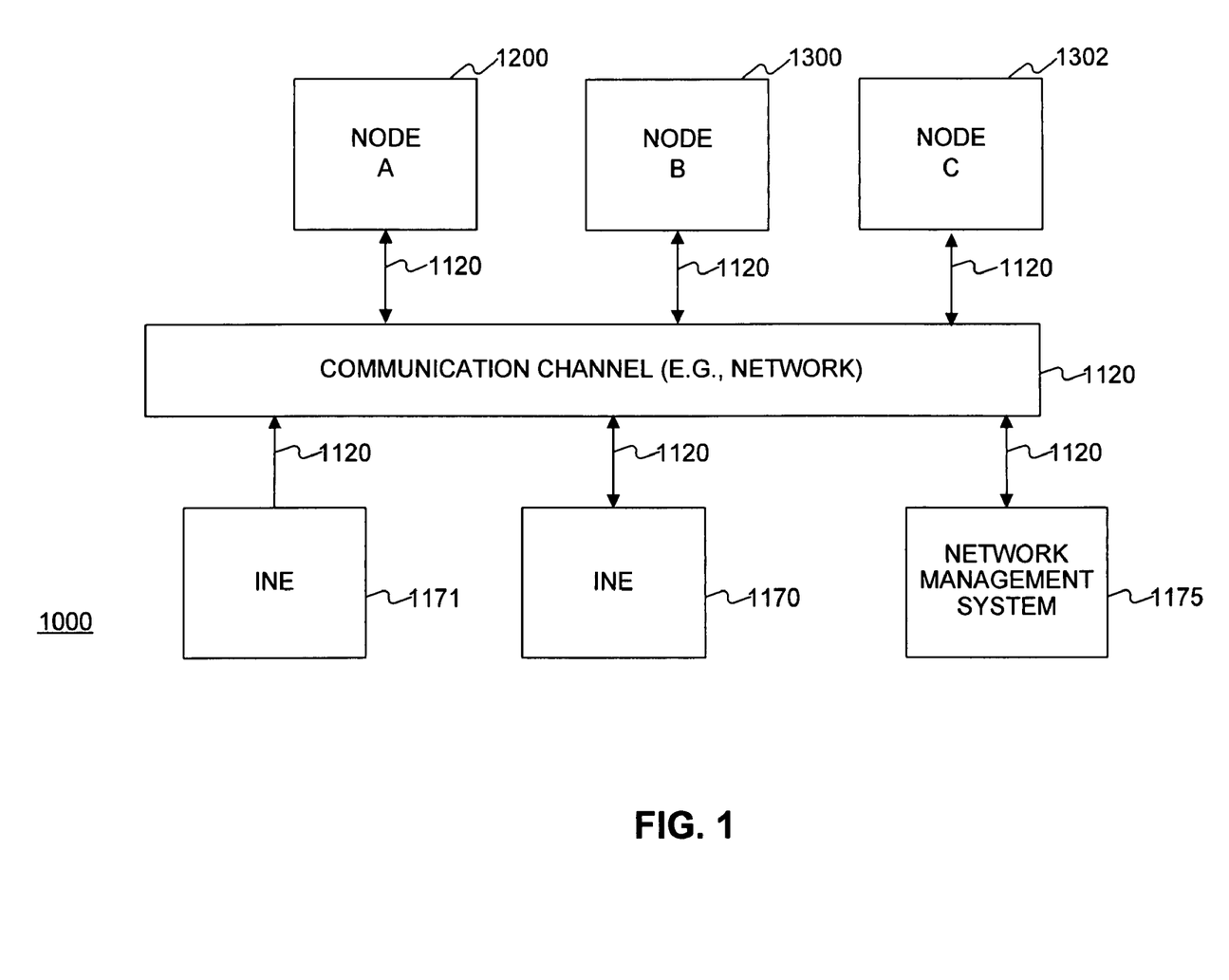
FIG. 1 illustrates an exemplary network environment.

FIG. 1 depicts an exemplary network environment 1000 consistent with one embodiment of the present invention. Referring to FIG. 1, the network environment 1000 includes one or more nodes A-C 1200, 1300, 1302 connected by a communication channel (e.g., a network) 1120 to one or more Intelligent Network Elements (INE) 1170-1171 and a Network Management System (NMS) 1175, all of which will be described in greater detail below.

Each of nodes A-C 1200, 1300, 1302 represents a point on the network such as a processor, a router, a switch, a gateway, or any other communication or data processing device.

Communication channel 1120 may function as a communication network (or links) and may include, alone or in any suitable combination a telephony-based network, a local area network (LAN), a wide area network (WAN), a dedicated intranet, the Internet, a wireless network, or a bus. Further, any suitable combination of wired and/or wireless components and systems may be incorporated into the communication channels. The term "network" means a system of interconnected nodes including corresponding links and may include one or more of the components depicted in network environment 1000. As used herein, a connection means a path, such as a link or a tunnel.

The Intelligent Network Elements (INE) 1171-1170 function to test an interface (also referred to as the "interface under test") at a node (e.g., node 1200) by configuring another interface at the node, such that the "configured interface" has the same (or similar) quality of service (QoS) parameters to the QoS parameters of the interface under test.

Moreover, one INE 1170 may generate packets and send these packets through the configured interface at node 1200. The packets sent through the configured interface may be generated so that they are similar to the type of packets received at the interface under test. Another INE 1171 may function to receive any generated packets. INE 1171 may also use the received packets to determine one or more performance parameters for node 1200, such as latency, jitter, or packet loss. These parameters serve to test the interface under test at node 1200. As a result, the INE intelligently tests an interface at node 1200 by configuring another interface at the same node and sending packets through the other interface. If multiple interfaces require testing at node 1200, the INE can reconfigure the other interface to have the same (or similar) QoS parameters as those other interfaces under test, and can generate packets that are similar to the packet type received at each interface under test. If multiple nodes are present in network environment 1000, INE 1170 can connect (either virtually or physically) to multiple nodes and test their interfaces. As such, systems and methods consistent with one embodiment of the present invention, reduces (if not eliminates) the need to have a test probe at each interface and at each node in a network.

Moreover, in some embodiments, each of INE 1170 and 1171 may be embodied to have the features disclosed in U.S. patent application Ser. No. 10/845,517, filed May 14, 2004, entitled "SYSTEMS AND METHODS FOR INFERRING SERVICES ON A NETWORK," which is incorporated herein by reference in its entirety. Such features may include participating in a network by, for example, receiving information, such as statistics, event information (e.g., network failures), and topology information (e.g., interfaces, links, and routes to other nodes); and providing information to NMS 1175 including information regarding each of nodes A-C 1200, 1300, 1302 or any other node (e.g., a router) in network environment 1000.

Network Management System (NMS) 1175 may be embodied by one or more data processors. NMS 1175 may function to infer one or more services on network 1000 and to manage network 1000. One of ordinary skill in the art would recognize that network management includes the execution of one or more functions for controlling, planning, allocating, deploying, coordinating, and/or monitoring the resources of a network. Moreover, when a plurality of INEs are present in a network, NMS 1175 may aggregate information provided by the INEs and use that aggregate information to infer one or more services on the network. A service (e.g. an inferred service) may correspond to a virtual private network between nodes, such as node A 1200 and node B 1300. NMS 1175 may be able to infer that one or more virtual private network services exist between nodes 1200 and 1300 by, for example, detecting route targets exported by node A 1200 and/or node B 1300. See for example RFC-2547, E. Rosen et al., The Internet Society (1999), "BGP/MPLS VPNs," that describes route targets and BGP/MPLS (Border Gateway Protocol/Multiprotocol Label Switching) VPNs (draft-ieff-l3vpn-rfc2547bis-01.txt, E. Rosen et al., The Internet Society, September 2003, "BGP/MPLS IP VPNs). In addition to layer-3 type VPNs, such as BGP/MPLS VPNs, other types of VPNs may by inferred including, for example, layer-2 VPNs.

Figure 2:
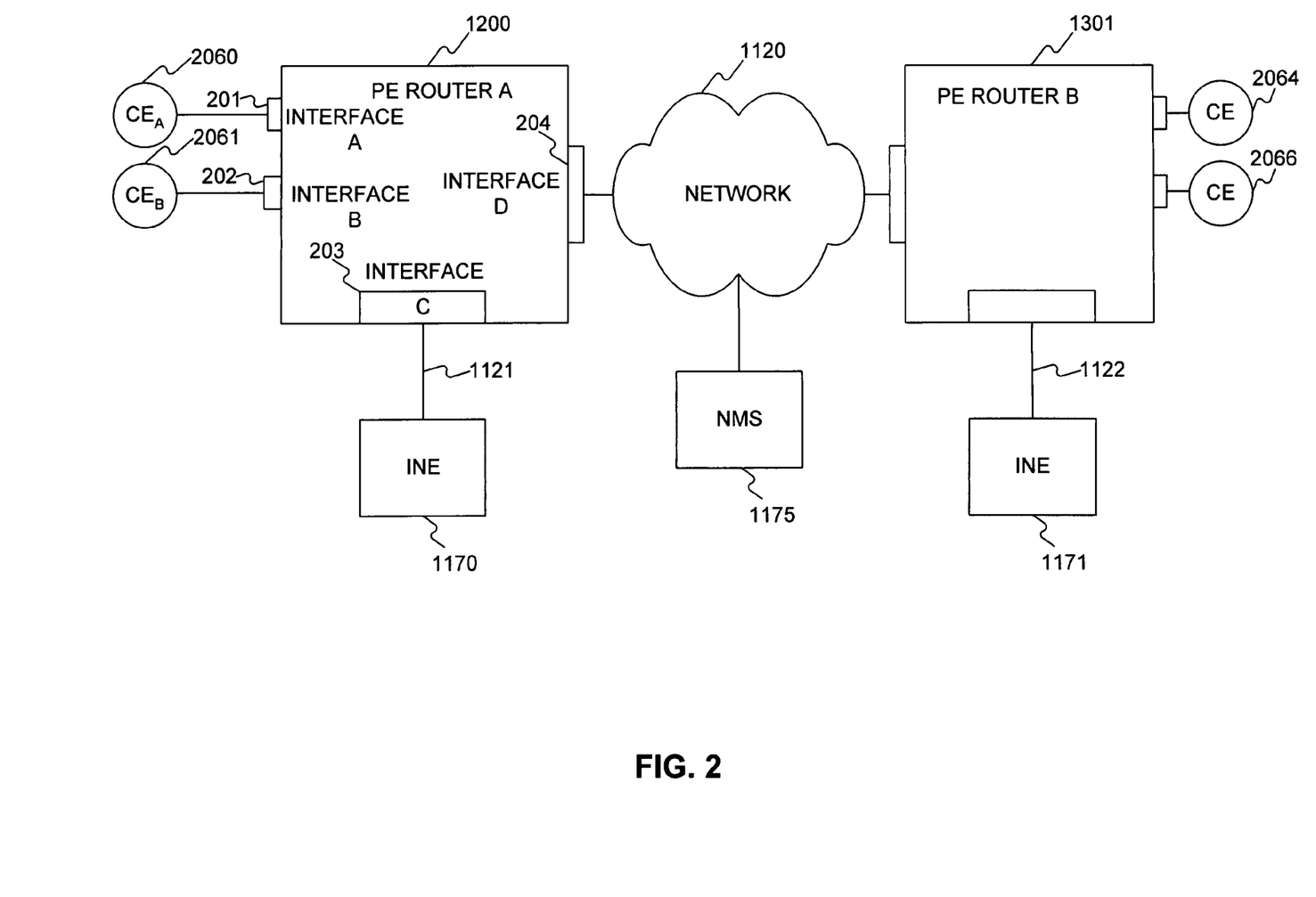
FIG. 2 depicts, in greater detail, a portion of the FIG. 2 network environment.

FIG. 2 depicts a portion of network environment 1000 in greater detail. In particular, node A 1200 and node B 1301 are each depicted as a router, and communication channel 1120 is depicted as an Internet Protocol (IP) network, such as the Internet.

Node A 1200 (labeled PE Router A) may be embodied as a router, such as a Provider Edge (PE) router configured with BGP/MPLS (Border Gateway Protocol/Multiprotocol Label Switching) VPNs. One of ordinary skill in art will recognize that commercially available software may be configured on node A to implement tunnels and corresponding BGP/MPLS VPNs. Moreover, PE Router 1200 may include interface A 201 to a Customer Edge device ($CE_A$) 2060, interface B 202 to customer edge device ($CE_B$) 2061, interface C 203 to INE 1170, and interface D 204 to network 1120. The interfaces may be embodied as any type of physical interface including, for example, an Ethernet interface or a wireless interface. Moreover, interface C 203 and INE 1170 may be connected by a link 1121 which may be a direct connection or a network, such as network 1120. In addition, Customer Edge devices 2060-2066 may be embodied as any type of customer device, such as a Customer Edge (CE) router (see, e.g., RFC-2547) or any other edge device serving as an interface between a customer and a network. Node B 1301 (labeled PE Router B) may be configured in a manner similar to PE Router A 1200.

Figure 3:
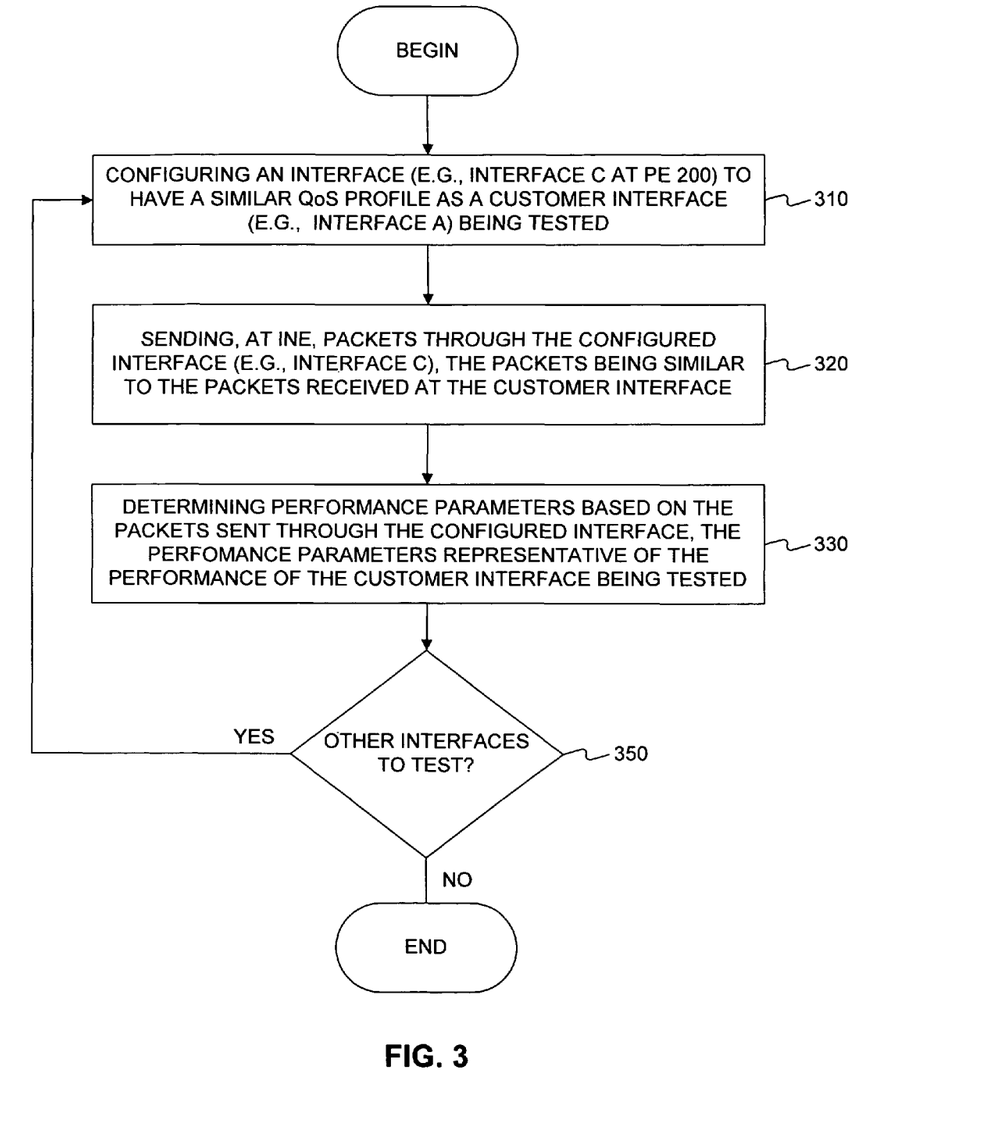
FIG. 3 is a flowchart showing exemplary steps for determining performance using an intelligent test probe.

FIG. 3 is a flowchart with exemplary steps for determining the performance of a node (or the interfaces therein). Referring to FIGS. 2 and 3, INE 1170 may configure an interface, such as interface C 203, to have a similar QoS profile as customer interface A 201, which is the "interface under test" (step 310). INE 1170 may then send packets through the configured interface C 203. In some embodiments, the generated packets sent through interface C 203 may be of the same type (e.g., header, protocol(s), and/or size) (step 320) as packets typically received at interface A 201, such that the generated packets are injected into a tunnel (not shown) between PE Routers A and B 1200, 1301. INE 1171 may then receive the packets from INE 1170, interface C 203, network 1120, and PE Router 1301. INE 1171 may then determine one or more performance parameters based one the received packets (step 330). For the interface under test, INE 1171 may determine, based on the received packets, performance parameters, such as latency, jitter, and packet loss. If other interfaces require testing, INE 1170 may then repeat steps 310-330 for each of those interfaces (step 340). With the above general description, the following describes steps 310-340 in greater detail.

In one embodiment, before beginning steps 310-340, a user of a network management system, such as NMS 1175, may select one or more virtual private networks (VPNs), such as BGP/MPLS VPNs, to monitor and test performance. In some instances, a user may be prompted to select a specific customer, a customer's VPNs, a link (or connection), and/or specific services for that customer. For example, a user may select customer A's Voice over IP (VoIP) traffic only between New York and Los Angeles. Moreover, the user may be prompted to select how frequently the specific customer VPNs should be tested, the specific parameters to test, and/or any thresholds for generating alarms. The user's profiles for testing can be saved in the INEs or, alternatively, NMS 1175.

To configure an interface, such as interface C 203, to have a similar QoS profile as the interface under test, which in this case is customer interface A 201 (step 310), INE 1170 may issue a query to PE Router A 1200. In this example, PE router A serves as the head-end (or origin) of a tunnel from PE Router A 1200 to PE Router B 1301. By querying PE Router A 1200, INE 1170 may obtain the QoS profile associated with interface A 201 including, for example, the associated class(es) of service, queue priority, and/or drop precedence. One of ordinary skill in the art would recognize that such profile information can be grouped in many commercially available routers as the "QoS Profile," and different profiles associated with different interfaces may be identified uniquely with a name, a number, or other like identifier. In such a case, INE 1170 may simply retrieve the interface A 201 QoS Profile identifier and configure interface C 203 with the same QoS profile.

In some embodiments, INE 1170 may query PE Router A 1200 by reading several MIB (Management Information Base) tables using the SNMP (Simple Network Management Protocol) or using a Command Line Interface (CLI). In some other embodiments, INE 1170 may determine the QoS profile of interface A 201 by discovering such information, as described in co-pending U.S. application U.S. patent application Ser. No. 10/845,517 entitled "SYSTEMS AND METHODS FOR INFERRING SERVICES ON A NETWORK". In such discovery instances, NMS 1175 may store QoS information and any updates (changes and refreshes), allowing INE 1170 to simply read the QoS profile for interface A 201 from QoS information stored in NMS 1175. The QoS profile information may then be configured at interface C 203 (or router 1200) by setting the interface using SNMP, CLI, or the like.

To send packets (step 320), INE 1170 may send packets through link 1121 and interface C 203 with the same (or similar) characteristics as packets received at interface A 201. For example, if interface A 201 has a predetermined QoS Profile Identifier named "Platinum 1" associated with VoIP traffic at PE Router A 1200, INE 1170 may generate packets that are of the same (or similar) type (in this example VoIP type packets) including header field(s), size, and/or protocol(s.) INE 1170 may then send the generated packets to interface C 203. At interface C, PE Router A applies the Platinum 1 QoS profile and any associated rules (also known as tunnel injection criteria) that dictate how, when, and what traffic should be allowed access to a BGP/MPLS tunnel originating at PE Router A 1201 and terminating at PE Router B 1301.

One of ordinary skill in the art would recognized that packets received at interface A 201 may be packets from customer 2061 with various destinations including, e.g., destinations 2064 and 2066.

In one embodiment, INE 1170 sets, based on the QoS profile and any corresponding injection criteria for the tunnel, one or more of the following header fields in the packets generated by the INE 1170: (1) a DSCP (Differentiated Services Code Point) value that is indicative of the incoming priority of the packet; (2) an IP protocol number (e.g., based on the IP protocol, PE Router A 1200 may treat packets differently); (3) an application protocol number (if PE Router A 1200 is capable of treating different applications differently); and (4) source and destination IP addresses and/or ports. Returning to the above example, the injection criteria would include rules that would allow or deny access to a BGP/MPLS tunnel from PE Router A 1200 to PE Router B 1300 based on, for example, one or more of the values associated with (1)-(4).

To determine performance parameters (step 330), INE 1171 receives the packets from interfaces 203 and 204, network 1120 (and the BGP/MPLS tunnel therein), PE Router 1301, and link 1122. Based on the received packet(s), INE 1171 will determine one or more performance parameters, such as latency, jitter, and/or packet loss. For example, if the packet generated by INE 1170 includes a time stamp, INE 1171 can measure latency, jitter, and packet loss at INE 1171. Moreover, INE 1171 may perform additional processing to remove the effects of link 1121 and link 1122, as will be described in greater detail below with respect to FIG. 8. The determined one or more parameters represent the performance of the interface under test, which in this case is interface A 201.

If other interfaces (e.g., interface B 202) are scheduled to be tested, INE 1170 then repeats steps 310-330 for those interfaces (step 340). Otherwise, the process ends.

Figure 4:
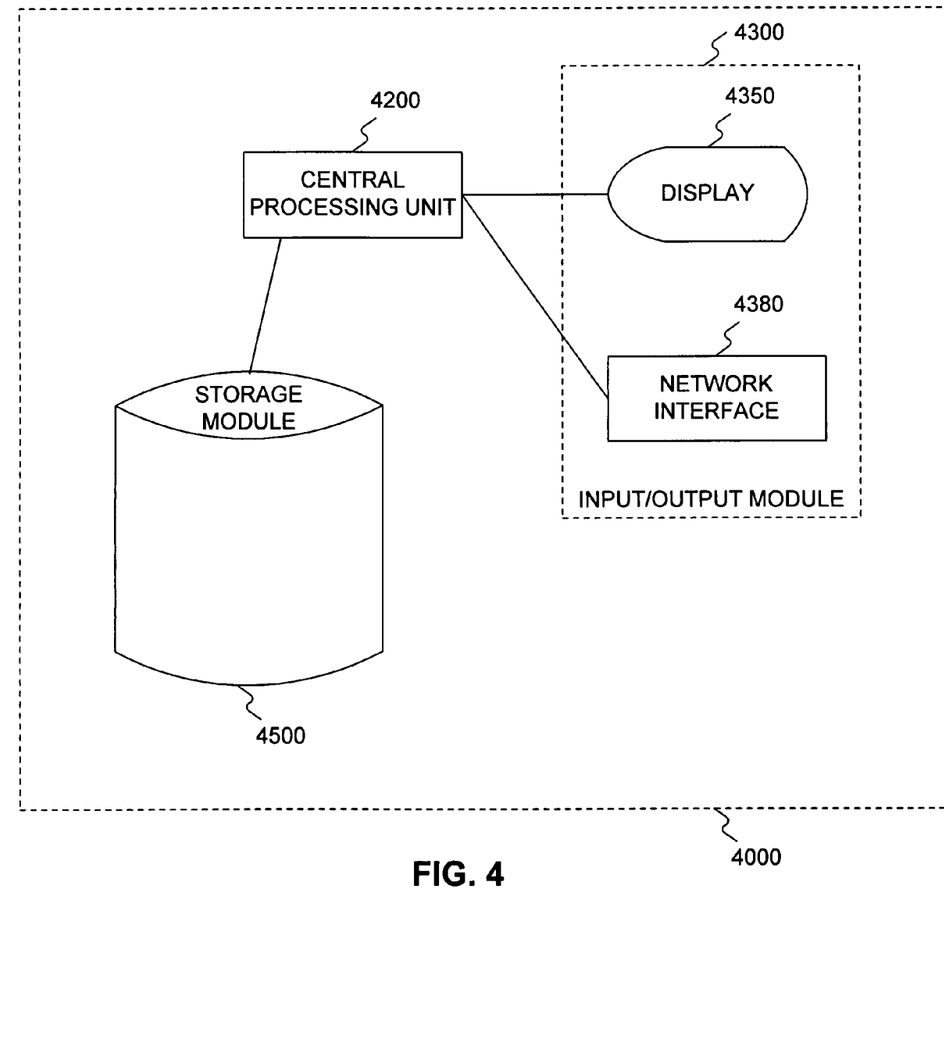
FIG. 4 illustrates an exemplary system environment.

Each of nodes A-C 1200, 1301, 1302, INEs 1170-1171, and NMS 1175 may be implemented as a data processor, such as data processor 4000 depicted in block diagram form at FIG. 4. Data processor 4000 may include a central processing unit 4200, a storage module 4500, and/or an input/output (I/O) module 4300. In the case of nodes A-C, data processor 4000 may include code, which configures CPU 4200 to function as a router or a switch. Furthermore, the router or switch may represent one or more nodes on the network.

The I/O module 4300 may include one or more input/output (I/O) devices including a display 4350, a keyboard, a mouse, an input storage device, and a network interface 4380. Network interface 4380 permits data processor 4000 to communicate through a network, such as communication channel 1120. For example, network interface 4380 may be embodied as an Ethernet network interface card or a wireless LAN interface card, such as a card compatible with the IEEE 802.11 series of wireless LAN standards. In some embodiments, display 4350 is separate from data processor 4000. For example, display 4350 may be provided on another data processor connected remotely to data processor 4000.

Central processing unit 4200 may include, for example, one or more of the following: a central processing unit, a co-processor, memory, registers, and other processing devices and systems as appropriate. Moreover, unit 4200 (or associated memory) may include source code (not shown) that configures data processor to function as a router to route packets, such as IP packets. Moreover, such code may include code to configure the router to function as a router in a VPN, such as a BGP/MPLS VPN, including associated PE nodes and CE nodes used in BGP/MPLS VPNs, (see, e.g., RFC-2547, "BGP/MPLS VPNs,").

Storage module 4500 may be embodied with a variety of components or subsystems capable of providing storage including, for example, a hard drive, an optical drive, a general-purpose storage device, a removable storage device, and/or memory. Moreover, storage module 4500 may include one or more of the following: network object information for each of the nodes of network 1000, inferred network objects, inferred services, QoS profile information for one or more nodes, performance information for the one or more nodes, and any other information associated with network 1000.

Although CPU 4200 is generally described in terms of data processor 4000, CPU 4200 may also be incorporated into any other data processing or communication device including, for example, a router, a switch, a gateway, a bridge, and/or a network management system. For example, in one embodiment, each of nodes A-C 1200, 1301-1302 are embodied as routers; INEs 1170-1171 are embodied as a data processor incorporated into a high performance core router; and NMS 1175 is embodied as a data processor, such as a high performance work station (e.g., a SUN Fire E25K Server or a SUN V12 80).

Figure 5:
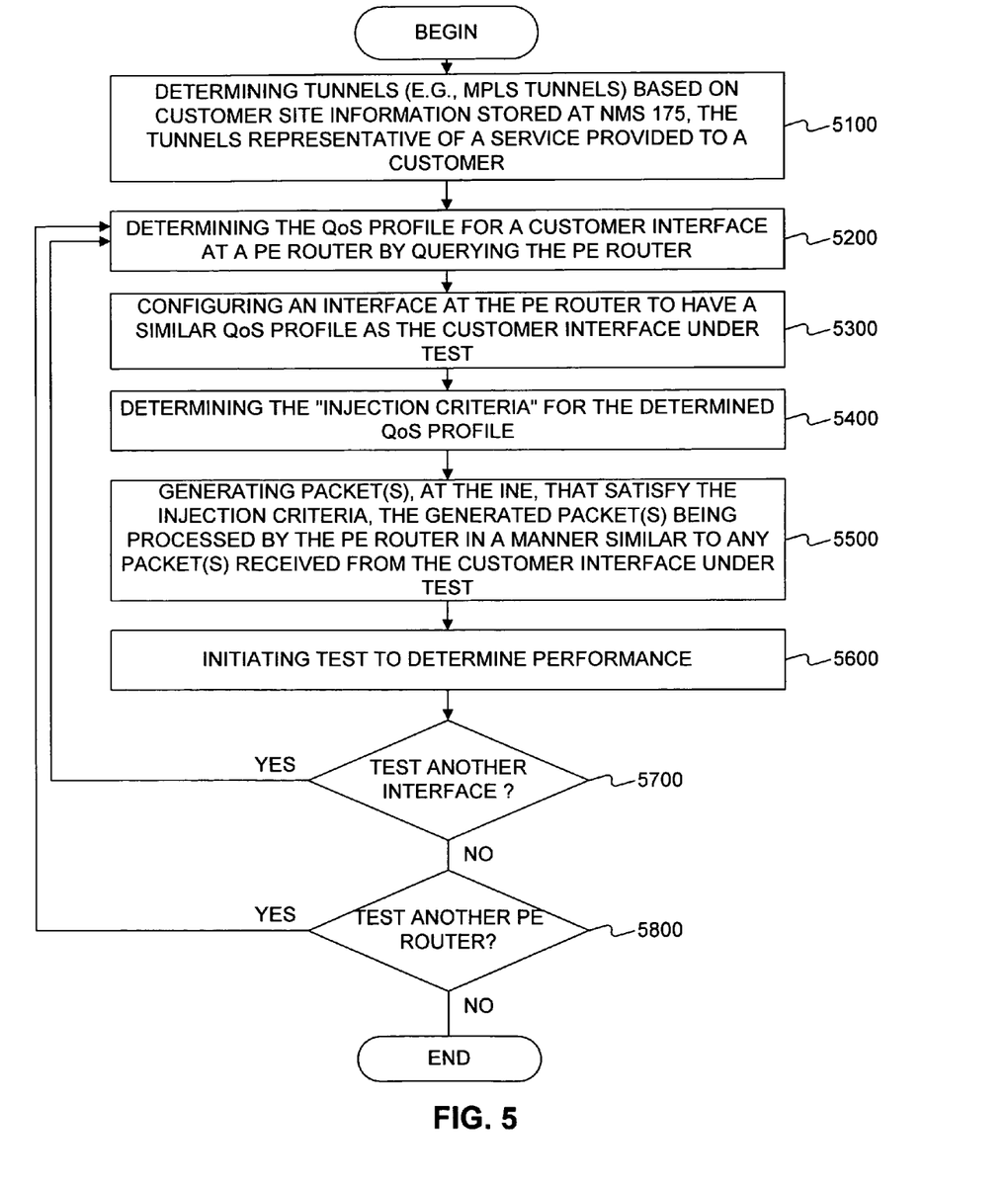
FIG. 5 is another flowchart showing exemplary steps for determining performance using an intelligent test probe.

FIG. 5 depicts another exemplary flowchart with steps for determining performance consistent with another embodiment of the present invention. Referring to FIGS. 2 and 5, INE 1170 may determine which tunnels to test based on information stored at NMS 1175 (step 5100), with the tunnel corresponding to a service provided to a customer. Next, INE 1170 may determine a QoS profile for the customer's interface (e.g., interface A 1201) by querying PE Router A 1200 (step 5200). INE 1170 may then configure an interface (e.g., interface C 203) at PE Router 1200 to have a similar QoS profile as interface A 201, which is the interface under test (step 5300). INE 1170 may also determine the injection criteria for the determined QoS profile (step 5400). Specifically, packets received at an interface with the determined QoS profile are processed with one or more rules (also referred to as "injection criteria") that specify the criteria for allowing packets to access a BGP/MPLS tunnel between PE Router A 1200 and PE Router B 1301. Next, INE 1170 generates packets that satisfy the determined injection criteria and then sends the generated packets to PE Router 1200 via link 1121 and interface C 203 (step 5500). Based on an injection criteria, PE Router A 1200 sends the generated packets to a BGP/MPLS tunnel between PE Router A 1200 and PE Router B 1301. Specifically, only packets that satisfy the QoS profile and corresponding injection criteria will be allowed access to the BGP/MPLS tunnel. INE 1171 then receives the generated packet from INE 1170, interface C 203, PE Router A 1200, network 1120, PE Router B 1301, and link 1122. INE 1171 may then initiate a test to determine performance based on one or more packets received from INE 1170 (step 5600). If there are other interfaces at PE Router A 1200, INE 1170 may then test, using steps 5100-5600, those other interfaces (step 5700). If there are other nodes, INE 1170 may then test, using steps 5100-5600, those other nodes and their corresponding interfaces (step 5800). Otherwise, processing is complete.

Figure 6:
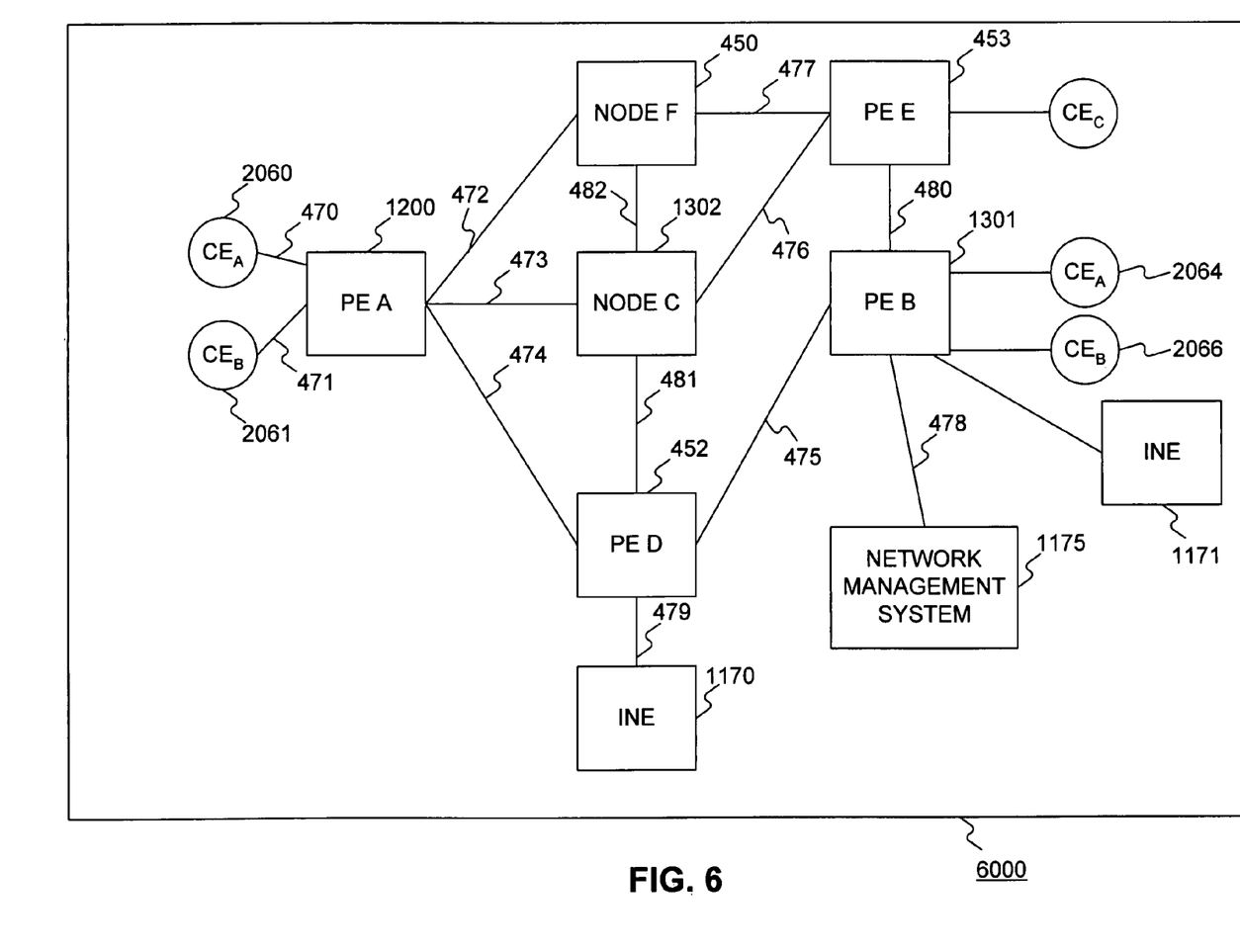
FIG. 6 illustrates another exemplary network environment.

FIG. 6 depicts the exemplary network environment of FIG. 2 with additional nodes. Network 1120 is depicted as one or more links 450-482. Moreover, INE 1170 is attached to the Ethernet interface of PE node D 452.

Referring to FIG. 6, $CE_A$ represents a customer with traffic (e.g., VoIP packets). Customer $CE_A$ 2060 may have a service level agreement (SLA) with a network service provider. The SLA enables the customer to access a traffic-engineered tunnel(s) between PE node A 1200 and PE node B 1301. Typically, such tunnels are shared across multiple customers (e.g., customers A and B 2060-2066) based on the agreed level of service associated with each customer and on the type of traffic that originates from each customer. For example, customer $CE_A$ 2060 may contract for "Platinum" level service with the network service provider. The Platinum QoS level may specify performance parameters (e.g., availability, delay, and packet loss) sufficient to satisfy the customer's delay sensitive VoIP voice traffic. On the other hand, the customer may contract for a different service level for other traffic, such as email, video, etc. For example, the customer may have a SLA that specifies a lower, best efforts service ("Bronze" service) for email. Similarly, customer $CE_B$'s 2061 may contract for "Platinum" level service for delay sensitive traffic, such as Voice Over IP (VoIP) traffic. In this example, both $CE_A$'s VoIP traffic and $CE_B$ VoIP traffic may use the same tunnel between PE node A 1200 and PE node B 1301 since that tunnel has been engineered to satisfy VoIP traffic.

Figure 7:
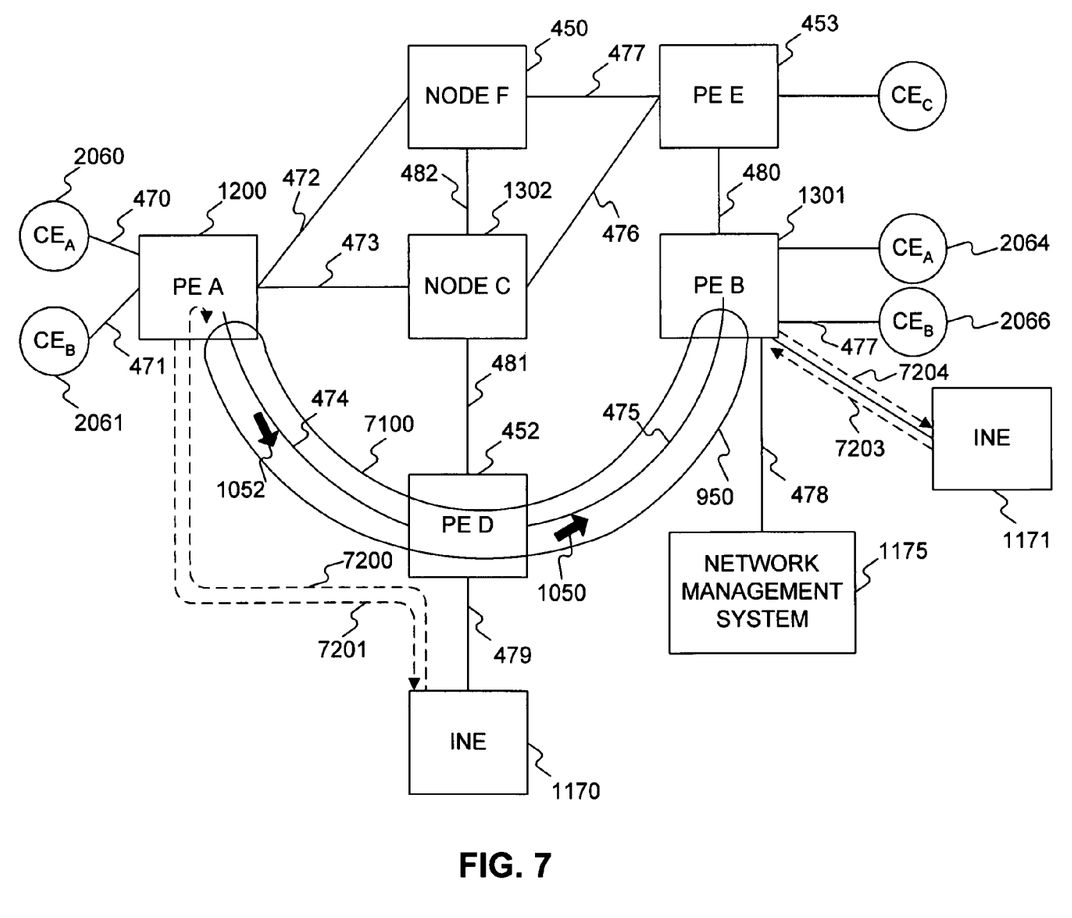
FIG. 7 illustrates the tunnels of the FIG. 6 network environment.

FIG. 7 depicts network 6000 with a tunnel 7100, such as a BGP/MPLS tunnel between PE node A 1200 to PE node B 1301. Referring to FIGS. 5 and 7, INE 1170 may determine which tunnels to test based on information stored at NMS 1175 (step 5100), with the tunnel representative of a service provided to a customer. As noted above, $CE_A$ 2060 may have VoIP packet traffic for routing from PE Router A 1200 to PE Router B 1301 over tunnel 7100. Moreover, the VoIP traffic may represent a service provided by a network service provider and guaranteed to satisfy a SLA, which specifies, inter alia, performance (e.g., availability, latency, packet loss, jitter, and the like).

Although INE 1170 may directly connect to PE Router A 1170 (as depicted in FIG. 2), FIG. 7 depicts a virtual connection (through a tunnel 7200) between INE 1170 and PE Router A 1200. For example, INE 1170 may establish a virtual connection to PE Router A using a variety of techniques including, for example, a GRE (Generic Routing Encapsulation, RFC-2784) protocol, IP encapsulation within IP (also referred to as IP-IP tunneling), a VLAN (Virtual Local Area Network), and ATM PVC (Asynchronous Transfer Mode Permanent Virtual Circuit). One of ordinary skill in the art will recognize that commercial software and/or hardware is available to establish such connections between nodes in a network. When GRE is used, INE 1170 may implement the Linux operating system with different IP addresses as "aliases" of the main INE 1170 IP address so that multiple GRE tunnels can be created between INE 1170 and PE Router A 1200. Although the description made herein refers to the use of GRE tunnel 7200, any other connection mechanism may be used instead including VLAN mechanisms.

To compensate for any packet loss, latency, and/or jitter characteristic introduced by the GRE tunnel 7200 from INE 1170 to PE Router A, in some embodiments two such tunnels 7200, 7201 are implemented to conduct a loop back test to characterize the GRE portion of the network. The characterization enables INE 1171 to remove the jitter, packet loss, latency contributions of the GRE tunnel 7200 from the tunnel of interest 7100.

INE 1170 may determine a QoS profile for the customer $CE_A$ 2060 at PE Router A 1200 by querying the router (step 5200) or reading the profile information from NMS 1175. INE 1170 may then configure another interface at PE Router A 1200 to have a similar (or the same) QoS profile as customer $CE_A$'s interface ("interface under test") (step 5300). INE 1170 may also determine the injection criteria for the determined QoS profile (step 5400). In particular, the injection criteria at PE Router A specify the type of packets that are allowed access to tunnel 7100. For example, customer $CE_A$'s VoIP packets may be allowed access to tunnel 7100, but email packets may be denied.

Next, INE 1170 generates packets (step 5500) that satisfy the determined injection criteria and sends the generated packets to PE Router A 1200 via link 1121 and interface 203 (not shown). Returning to the above example, INE 1170 may generate packets that are similar to VoIP packets (e.g., similar header, structure, and/or size). INE 1170 then sends the generated packets through GRE tunnel 7200 to PE Router A 1201. PE Router A 1201 then applies its injection criteria to the received packets, which should allow the generated packets to be granted access to tunnel 7100 (just like $CE_A$'s VoIP packets which are granted access to tunnel 7100). When INE 1170 generates packets that are "similar" to packets received at the interface under test from $CE_A$, INE 1170 generates packets that are similar with respect to the injection criteria.

For example, if packets received at the interface under test are injected into tunnel 7100 solely based on a specific header field (e.g., a DSCP field value), INE 1170 would generate packets that are similar with respect to having at least the same header field as the interface under test packets.

The injection criteria may use the DSCP bits (for IP packets), EXP (for MPLS), Layer 2 information (VLAN-ID, logical L2 interface, L2 priority, etc.), and/or Layer 3+ information (protocol numbers, ports, transport layer status, etc.) to route a packet to a tunnel (or route) that satisfies the required (or specified) QoS for that packet. The injection criteria thus provide rules for packet selection and injection on to a route, such as a tunnel.

In some embodiments, a service provider may define three levels of QoS. The three service levels may consist of Best Efforts (BE), Expedited Forwarding (EF), and Assured Forwarding (AF). Specifically, IP routing traffic may receive BE service, voice may receive EF service, and video/multimedia signaling data and priority data may receive AF service.

For BE, a service provider may specify a default injection criteria that routes traffic to predetermined path(s), such as a BGP/MPLS tunnel. Moreover, the service provider may establish the path by specifying or configuring one or more of the following: rate (bandwidth), depth (available buffer space in a queue), Rmax (queue length at which there is a 100% probability of dropping a packet), peak rate (peak rate for a link), minimum policed unit (see, e.g. RFC-2212, "Specification of Guaranteed Quality of Service," S. Shenker, September 1997), Maximum packet size (as configured or a default if not configured at the router); $R_{min}$ (queue length at which there is a 0% probability of dropping a packet), Slope (value used to compute drop probability between $R_{min}$ and $R_{max}$), and a packet discard flag. For EF, a service provider may define another set of tunnels for packets satisfying the following injection criteria: EXP, DSCP, ILM (Incoming Label Map), VRF, IP Protocol (L3+), etc. In the case of AF, a service provider may define yet another set of tunnels for packets satisfying other injection criteria values. Like the BE case, a service provider may establish the EF and AF paths to have specific parameters, such as rate, depth, etc.

Returning to packet generation step 550, PE Router B 1301 receives the generated packets from tunnel 7100 and routes those packets to GRE tunnel 7204 and INE 1171. INE 1171 may then initiate tests of the received packet(s) to determine performance (step 5600). Moreover, in one embodiment, INE 1171 removes the packet loss, jitter, and latency effects of the GRE tunnels 7204 and 7200, so that the determined performance measurements represent only tunnel 7100.

One way to correct for the GRE tunnel portion 7200 is to use the traditional "ping" protocol utility (from the INE to the PE) on the GRE Tunnel 7200 and use the results to correct for the error introduced by the GRE tunnel 7200. Another ping can be performed over GRE tunnel 7204. The results of the ping tests, which provide time to traverse the tunnels, can be used to remove the effects of each of tunnels 7200 and 7204. A more accurate approach is to use a loop back (also referred to as a second tunnel approach). For example, to correct for GRE tunnel 7200, tunnel 7201 is established, and to correct for tunnel 7204, tunnel 7203 is established, as shown in FIG. 7.

Figure 8:
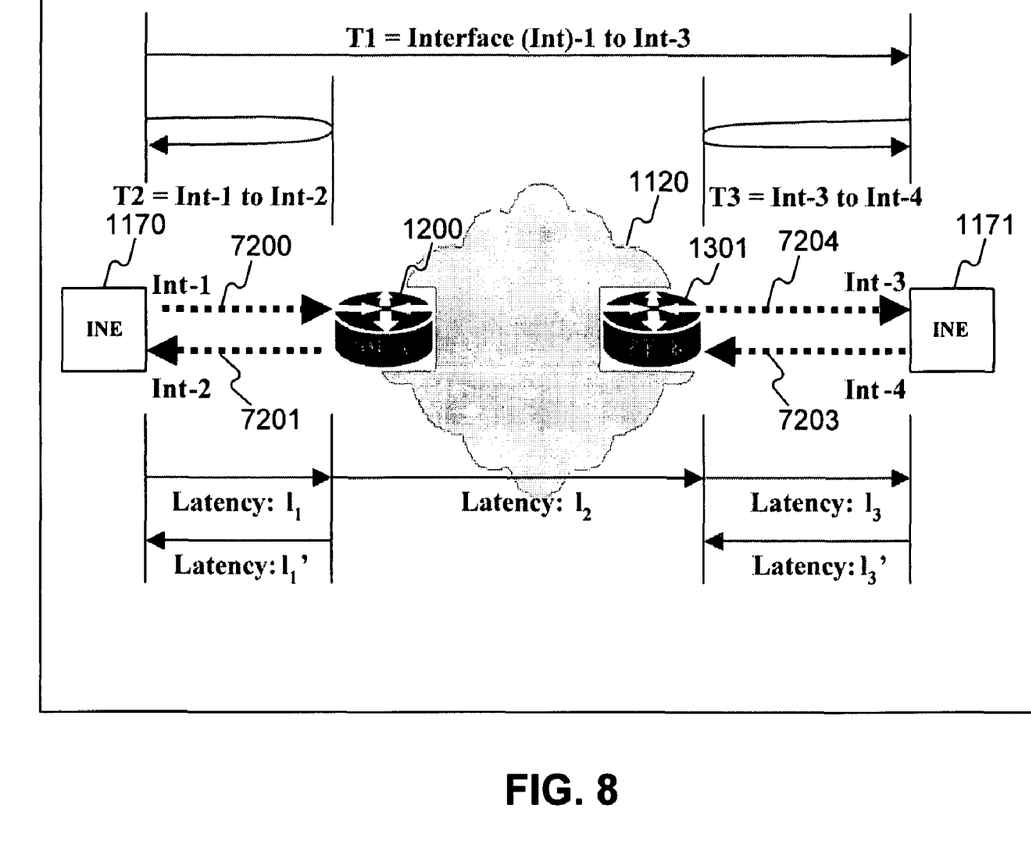
FIG. 8 depicts loop back tests performed to remove the performance contributions of the test probe host (referred to as the Intelligent Network Element (INE)

FIG. 8 depicts the tests performed by INE 1170 and 1171 to reduce (if not eliminate) the effects of GRE tunnels 7200 and 7204. Since 7200 and 7204 are not part of the path (i.e., tunnel 7100) for the interface of under test, the jitter, latency, and packet loss effects of GRE tunnels 7200 and 7204 should be removed from performance calculations made for the interface under test. In one embodiment, INE 1171 determines the time T1, which represents the end-to-end latency (time) measured between INE 1170 (as source) to INE 1171 (as destination). INE 1170 then determines time T2 by performing a loop back test, sending one or more packets (with time stamps) to tunnel 7200, PE Router A 1200, and returning on tunnel 7201. Meanwhile, INE 1171 determines time T3 by performing a loop back test, sending one or more packets (with time stamps) to tunnel 7203, PE Router B 1301, and returning on tunnel 7204.

Next, INE 1171 determines the value of "l2" which represents the latency between PE Routers A and B. In one embodiment, the value of l2 is determined based on the following equations:

$$l_1 + l_2 + l_3 = T_1 \qquad \text{Equation (1) and}$$

$$l_2 = T_1 - (l_1 + l_3) \qquad \text{Equation (2)}$$

where $l_1$ represents the latency between INE 1170 and PE Router A 1200; $l_2$ represents the latency between PE Router A 1200 and PE Router B 1301; $l_3$ represents the latency between PE Router B 1301 and INE 1171; and $T_1$ represents, as noted above, the end-to-end latency time measured between INE 1170 (as source) and INE 1171 (as destination).

From the loop back tests above, the following equations can also be used:

$$l_1 + l_1' = T_2 \qquad \text{Equation (3) and}$$

$$l_3 + l_3' = T_3 \qquad \text{Equation (4);}$$

where $l_3'$ represents latency between router 1301 and INE 1171; and $l_2'$ represents latency between router 1200 and INE 1700.

Moreover, if the following is assumed to be true:

$$l_1 \approx l_1' \text{ and } l_3 \approx l_3'.$$

The equations for $l_1$ and $l_3$ can be determined as follows:

$$l_1 = T_2/2 \text{ and } l_3 = T_3/2 \qquad \text{Equations (5) and (6).}$$

Based on Equations 2, 5 and 6, the latency $l_2$ of only tunnel 7100 (excluding the effects of the GRE tunnels 7200-7204) can be determined based on the following equation:

$$l_2 = T_1 - (T_2 + T_3)/2 \qquad \text{Equation (7).}$$

In some embodiments, the generated test packets are time stamped to facilitate performance testing, as note above. In these cases, the time stamp may be applied at the INE 1170 or PE Router A 1200. To reduce unwanted latency and reduce indeterminism, the time stamp may be applied to a packet at (or near) network interface 204 of PE Router A 1200 rather than at INE 1170.

Furthermore, if a time stamp is affixed to one or more packets at periodic intervals, the timing and packet loss can readily be determined. For example, if an INE generates a packet with a corresponding time stamp every one millisecond, the receiving INE can determine if a packet is missing—representing a packet loss—and the timing associated with the packet loss.

If there are other interfaces at PE Router A 201, INE 1170 may then test, using steps 5100-5600, each of those other interfaces (step 5700). If there are other nodes, INE 1170 may virtually connect to each of those nodes and then test each of those nodes (e.g., PE E 453) using steps 5100-5600 and their corresponding interfaces (step 5800).

Figure 9:
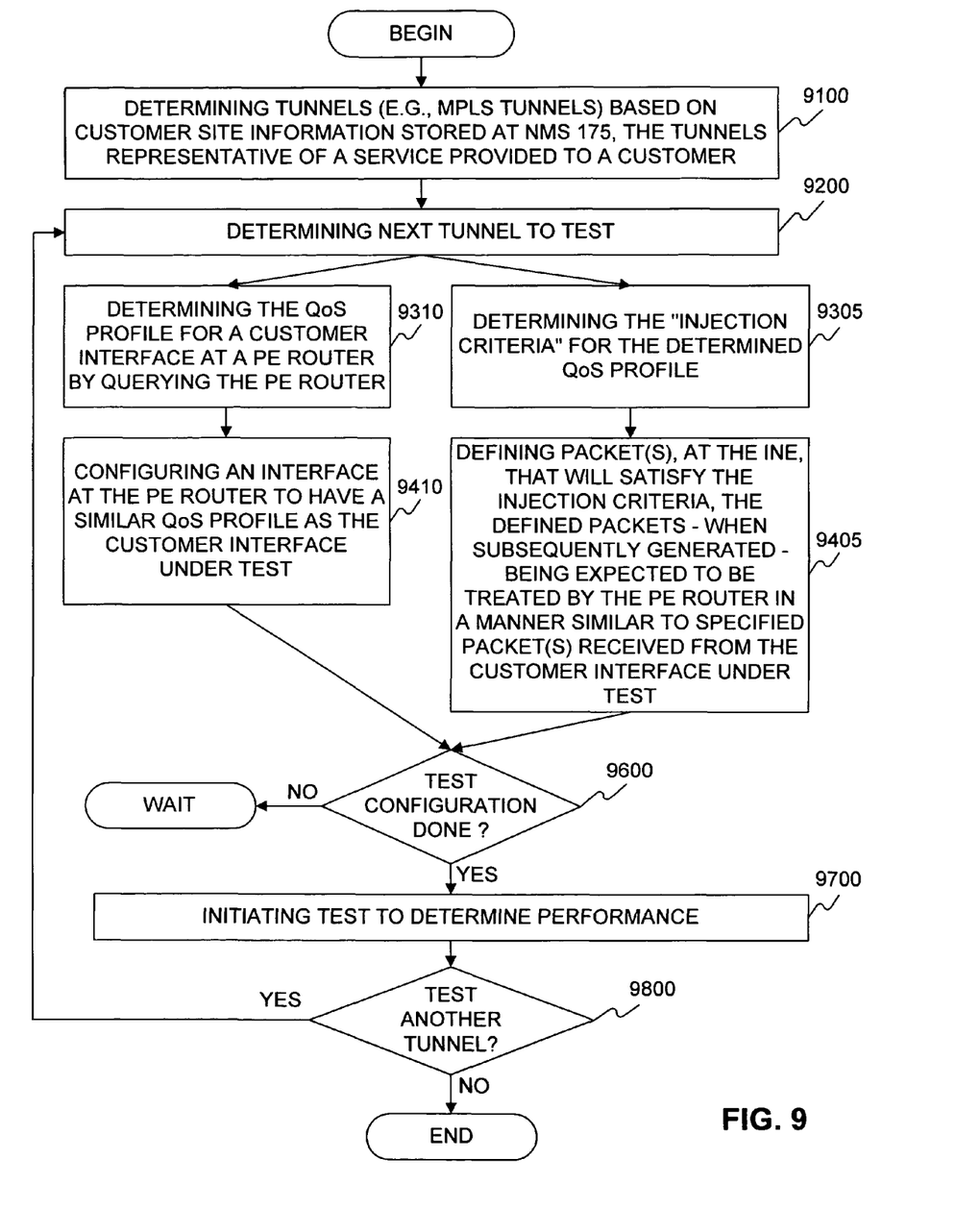
FIG. 9 is another flowchart showing exemplary steps for determining performance using an intelligent test probe.

FIG. 9 depicts another exemplary flowchart with steps for determining performance consistent with another embodiment of the present invention. Referring to FIGS. 2 and 9, INE 1170 may determine which tunnels correspond to a customer based on customer information stored at NMS 1175 (step 9100). For example, the customer information stored at NMS 1175 may indicate that Customer A is connected to PE Routers A and B 1200 and 1301 and there are tunnel(s) between the routers.

Next, INE 1170 may determine which one of the tunnels to test (step 9200). The determination of which tunnel to test may be based on information stored in NMS 1175 or may be driven by an event, such as an alarm, a failure, or degradation of network performance. Alternatively, the determination of which tunnel to test may be based on a schedule (e.g., hourly, daily, weekly, etc.), such as a user defined schedule stored in NMS 1175.

INE 1170 may determine a QoS profile for the customer's interface (e.g., interface A 1201) by querying PE Router A 1200, and then configure the interface (e.g., interface C 203) at PE Router 1200 to have a similar QoS profile (e.g., same rate, buffer size, etc.) as interface A 201, which is the interface under test (steps 9310-9410). Meanwhile, INE 1170 may determine the injection criteria for the determined QoS profile, and then generate packets (steps 9305-9405). The generated packets are defined such that they should be treated by PE Router 1200 in a manner similar to the packets received from interface A 201, with, for example, the generated packets having similar (or the same structure) in terms of header and size. For example, the packets may have the same header fields (DSCP, EXP, etc.) and protocols (e.g., protocol numbers), as the packets received from the customer's interface A 201, the interface under test.

When the configuration of interface C 203 and the generation of the packets is complete (steps 9405-9410), INE 1170 may then initiate a test of the interface under test, which in this case is interface A 201, by sending one or more packets from INE 1170 to INE 1171 through interface C 203, PE Router A, interface D 204, network 1120, PE Router 1301, and link 1122. If there are other tunnels to test, INE 1170 repeats steps 9100-9700 (step 9800). Some of the other tunnels may be at nodes other than node 1200. Otherwise, processing is complete.

Figure 10:
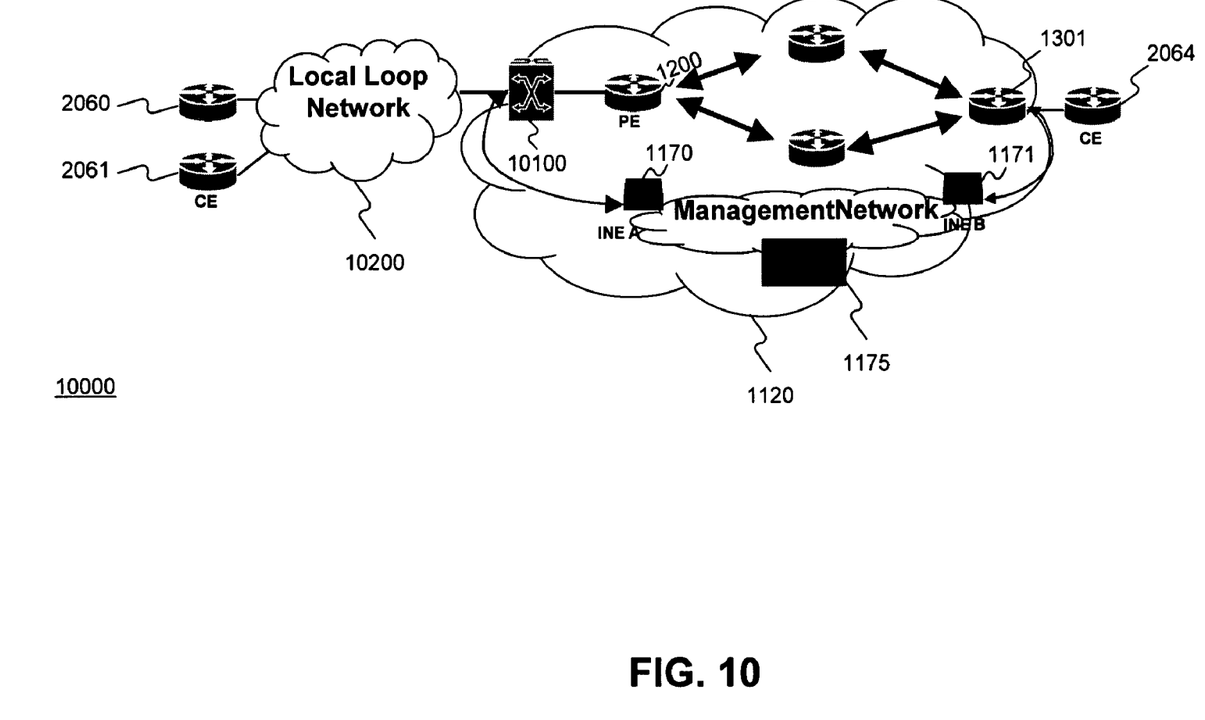
FIG. 10 depicts another exemplary network environment that includes a switch interfacing a local network.

FIG. 10 depicts another exemplary network environment 10000 consistent with the present invention. FIG. 10 includes a switch 10100. Switch 10100 may be any type of switch, such as an ATM switch, an Ethernet (e.g., Gigabit Ethernet) switch, or a wireless switch interface. In FIG. 10 switch 10100 serves as an interface between network 1120 and a second network (labeled local loop network) 10200. Network 10200 may be embodied in a manner similar to network 1120. Although network 10200 may be considered part of the same overall network as network 1120, in FIG. 10 functions as a separate network. For example, local loop network 10200 may be a wireless network for providing local access to customers, a local exchange carrier (LEC) network for providing local access to customers, or cable television drops to homes which provide local network access to customers.

When switch 10100 is present in network 1120, INE 1170 may connect to PE Router A 1200 through switch 10100. Moreover, when a test of a customer interface fails or shows degraded performance, INE 1170 (or NMS 1175) may "sectionalize" the failure by determining the performance of switch 10100. For example, if customer 2061 is having performance problems (e.g., cannot access customer 2604), INE 1170 (or NMS 1175) may be able to determine which section of the overall network is causing the problem. If an SNMP query of switch 10100 determines that the switch is operating correctly, INE 1170 may identify a cause within another "section" of network 1120. On the other hand, if an interface on switch 10100 is not operating correctly (e.g., shows degraded performance in terms of jitter, latency, or packet loss), INE 1170 may identify the cause as the local loop network 10200 "section" (or possibly the switch 10100 itself). In some embodiments, the use of switch 10100 may also improve latency measurements between INE 1170 and PE Router A 1200 (e.g., where the link includes a more deterministic switch 10100).

Furthermore, in some embodiments, INEs 1171 and 1170 may emulate one or more aspects of a CE router, as specified in RFC-2547 titled "BGP/MPLS VPNs."

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Moreover, the computer readable media may be in the form of a signal on a carrier wave or may be in the form of a storage media such as a disk. Examples of program instructions include, for example, machine code, such as produced by a compiler, and files containing a high level code that can be executed by the computer using an interpreter.

What is claimed is:

1. A method of testing a first interface of a first processor, the method comprising:
   configuring a second interface of the first processor, such that the configured second interface has one or more service parameters representative of the first interface;
   sending one or more packets from a second processor to the first processor via the configured second interface, the one or more packets being representative of one or more other packets received at the first processor from an external source via the first interface; and
   determining, based on the one or more packets sent via the configured second interface, one or more performance parameters corresponding to the first interface under test.

2. The method of claim 1, wherein configuring the second interface includes using, as the one or more service parameters, one or more quality of service parameters representative of at least one of the following: a latency, a jitter, and a packet loss.

3. The method of claim 1, including determining the one or more service parameters of the first interface by querying the first processor.

4. The method of claim 1, including determining the one or more service parameters of the first interface based on inferred services.

5. The method of claim 1, wherein the first processor serves as a Provider Edge router connected to a Customer Edge router, and wherein configuring the second interface includes using, as each of the first and second interfaces, an Ethernet interface.

6. The method of claim 1, including determining one or more rules based on the one or more service parameters, the one or more rules serving to route a packet from the first processor to a tunnel, when the packet satisfies at least one of the one or more rules.

7. The method of claim 6, including using a set of injection criteria as the one or more rules.

8. The method of claim 6, including:
   generating, at the second processor, one or more tunneling packets that satisfy at least one of the one or more rules, and sending the generated one or more tunneling packets from the second processor to the second interface of the first processor;
wherein the generated one or more tunneling packets are routed by the first processor from the second interface to the tunnel as if the generated packets had been received at the first interface.

9. The method of claim 8, wherein generating the one or more tunneling packets includes generating at least one of the one or more tunneling packets with a packet header that is based on a packet header of another packet received at the first interface.

10. The method of claim 9, wherein generating the one or more tunneling packets includes generating at least one of the one or more tunneling packets, such that a respective packet header includes an EXP field of an MPLS (Multi-Protocol Label Switching) packet, wherein the EXP field is the same as the EXP field of another packet received at the first interface.

11. The method of claim 8, wherein generating the one or more tunneling packets includes generating at least one of the one or more tunneling packets with a payload type similar to another packet received at the first interface.

12. The method of claim 8, including sending the generated tunneling packets, such that the generated tunneling packets are routed from the second interface to the tunnel based on at least one of the one or more rules, the tunnel serving as a virtual path through a network to a third processor, different from the first and second processors.

13. The method of claim 12, including receiving, at the third processor, the generated tunneling packets.

14. The method of claim 13, including determining one or more performance parameters based on the tunneling packets received at the third processor.

15. The method of claim 8, including connecting the second processor to the first processor.

16. The method of claim 15, including connecting the second processor to the first processor through a switch serving as an interface to a local network.

17. The method of claim 15, including connecting the second processor to the first processor through a tunnel between the first and second processors.

18. The method of claim 17, including establishing the tunnel between the first and second processors based on at least one of a Generic Routing Encapsulation (GRE) protocol, an IPSec (Internet Protocol Security) protocol, a VLAN protocol, and an IP encapsulation within IP (IP-in-IP) protocol.

19. The method of claim 18, including determining the one or more performance parameters by calculating latency contributions corresponding to the established tunnel between the first and second processors.

20. The method of claim 1, including selecting the first interface based on a schedule stored at a centralized processor for managing a network.

21. The method of claim 1, including configuring a third interface to have service parameters similar to a fourth interface, separate from the first and second interfaces.

22. The method of claim 21, including:
sending one or more packets from the second processor to the first processor through the configured third interface, the one or more packets representative of another packet received at the fourth interface; and
determining, based on the one or more packets sent through the configured third interface, one or more performance parameters corresponding to the fourth interface.

23. A system for testing a first interface of a first processor, the system comprising:
means for configuring, at the first processor, a second interface, such that the configured second interface has one or more quality of service parameters representative of the first interface;
means for sending one or more packets from a second processor to the first processor via the configured second interface, the one or more packets being representative of one or more other packets received at the first processor from an external source via the first interface;
means for receiving the one or more packets sent via the configured second interface; and
means for determining, based on the received one or more packets sent via the second interface, one or more performance parameters corresponding to the first interface.

24. A system for testing a first interface of a first processor, the system comprising:
a second processor; and
a second processor memory coupled to the second processor, wherein the second processor and the second processor memory are configured to:
configure a second interface of the first processor, such that the configured second interface has one or more quality of service parameters representative of the first interface;
send one or more packets to the first processor via the configured second interface, the one or more packets being representative of another packet received at the first processor from an external source via the first interface; and
a third processor; and
a third processor memory coupled to the third processor, wherein the third processor and the third processor memory are configured to:
receive the one or more packets sent via the configured second interface; and
determine, based on the received one or more packets sent via the configured second interface, one or more performance parameters corresponding to the first interface under test.

25. The system of claim 24, wherein configuring the second interface includes using, as the one or more service parameters, one or more quality of service parameters representative of at least one of the following: a latency, a jitter, and a packet loss.

26. A tangible and non-transitory computer-readable medium upon which is stored instructions to configure a data processor to perform a method for testing a first interface of a first processor, the method comprising:
configuring a second interface of the first processor, such that the configured second interface has one or more quality of service parameters representative of the first interface;
sending one or more packets from a second processor to the first processor via the configured second interface, the one or more packets being representative of one or more other packets received at the first processor from an external source via the first interface; and determining, based on the one or more packets sent via the configured second interface, one or more performance parameters corresponding to the first interface under test.

27. The computer readable medium of claim 26, wherein configuring the second interface includes using, as the one or more service parameters, one or more quality of service parameters representative of at least one of the following: a latency, a jitter, and a packet loss.

28. A network comprising:
a plurality of nodes;
a first node that is configured to:
   test a first interface at a router by configuring a second interface at the router, such that the configured second interface has one or more service parameters representative of the first interface, and
   send one or more packets to the router via the configured second interface, the one or more packets being representative of one or more other packets received at the first processor from an external source via the first interface; and
a second node that is configured to:
   receive the one or more packets, and
   determine one or more performance parameters corresponding to the first interface under test based on the received one or more packets.

29. The network of claim 28, wherein the first node tests a third interface by configuring a fourth interface, such that the configured fourth interface has one or more service parameters representative of the third interface and by sending one or more packets to the router through the configured fourth interface, the one or more packets being representative of another packet received at the third interface.

30. The network of claim 28, wherein the one or more service parameters includes one or more quality of service parameters representative of at least one of the following: a latency, a jitter, and a packet loss.

31. The computer-readable medium of claim 26, wherein the method includes:
receiving one or more packets sent via the configured second interface; and
determining, based on the received one or more packets sent through the second interface, one or more performance parameters corresponding to the first interface under test.

* * * * *